United States Patent [19]

Atencio

[11] 4,056,892
[45] Nov. 8, 1977

[54] ENGINEERING AND EDUCATIONAL TABLE AND METHOD OF USE

[76] Inventor: Jimmie P. Atencio, 18650 Rea Ave., Aromas, Calif. 95004

[21] Appl. No.: 677,771

[22] Filed: Apr. 16, 1976

[51] Int. Cl.² .............................................. G09B 25/06
[52] U.S. Cl. ........................................... 35/10; 35/16; 35/41
[58] Field of Search .................. 35/16, 34, 41, 60, 40, 35/10; 272/1 A; 273/3 C

[56] References Cited

U.S. PATENT DOCUMENTS

| | | | |
|---|---|---|---|
| 138,850 | 5/1873 | Buntin | 273/3 C |
| 155,449 | 9/1874 | Jones | 35/41 |
| 1,245,311 | 11/1917 | Black | 35/40 W X |
| 1,278,632 | 9/1918 | Gerashshenevsky | 35/41 |
| 1,546,880 | 7/1925 | Baranoff | 35/41 X |
| 1,929,250 | 10/1933 | McGiffert | 35/25 |
| 2,161,717 | 6/1939 | McDonald | 35/41 |
| 2,891,314 | 6/1959 | Haschek | 35/40 X |
| 3,768,181 | 10/1973 | Kiener | 35/41 |

OTHER PUBLICATIONS

Welch Scientific Co. Catalog Rec'd Oct. 1965, p. 931, only "Transits, Levels, Accessories".

*Primary Examiner*—Harland S. Skogquist
*Attorney, Agent, or Firm*—Brown & Martin

[57] ABSTRACT

A table, having a removable transparent top with a box-shaped container directly below the top supported on legs which are removable and adjustable, is provided with a granular medium within the container and various measuring instruments associated there-with for creating or forming miniature simulated landscapes. The granular medium comprises a substance such as sawdust or a mixture of sawdust and soil or artificial soils lightly wetted by a substance such as oil so that the medium may be formed into shapes that retain their configuration until disturbed by outside forces. The measuring instruments associated with the table include both metric and English scales formed along the edge of the table, a miniature transit mountable on the table, compass, stadia and other surveying instruments.

16 Claims, 11 Drawing Figures

U.S. Patent  Nov. 8, 1977  Sheet 1 of 2  4,056,892
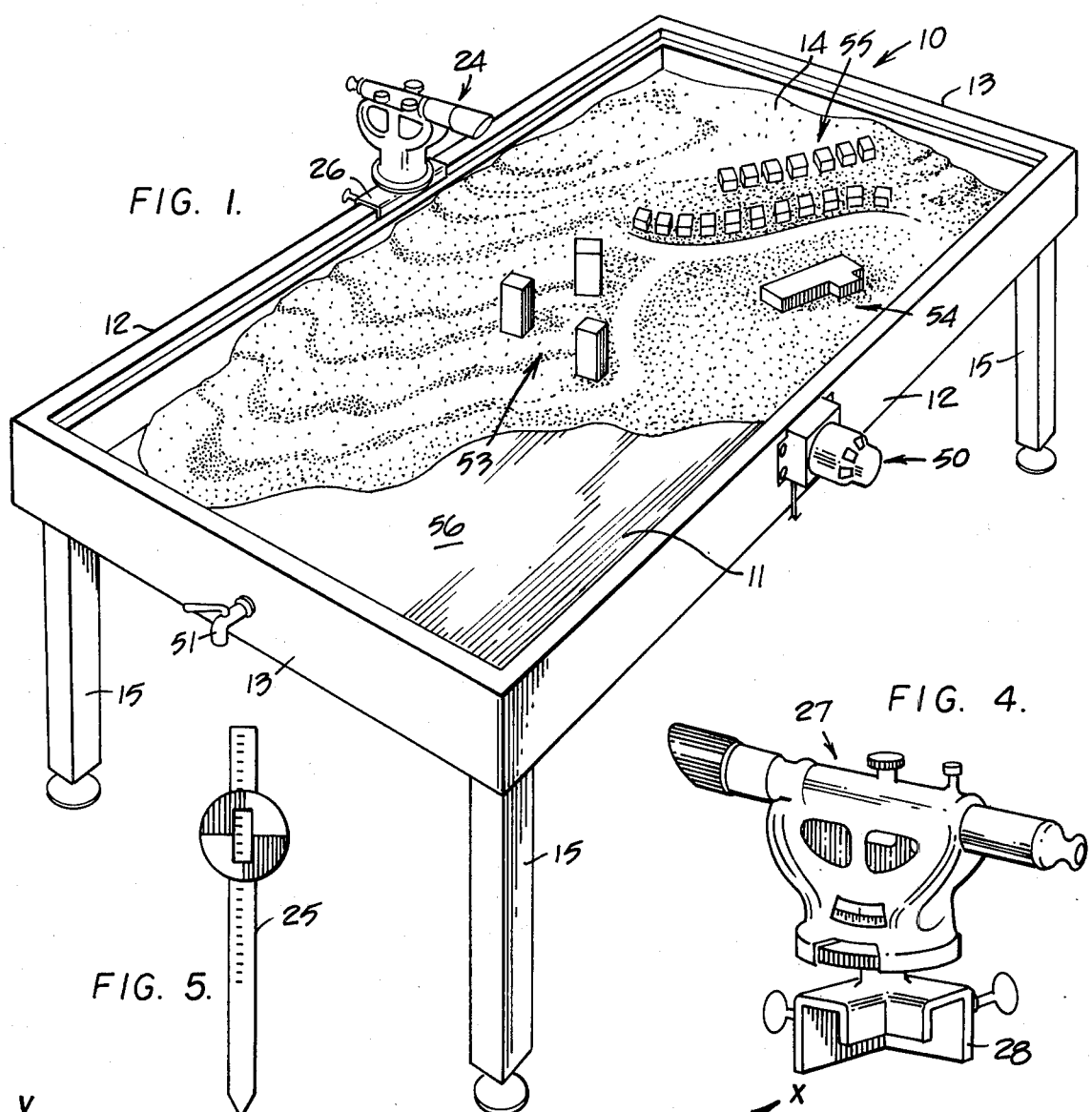
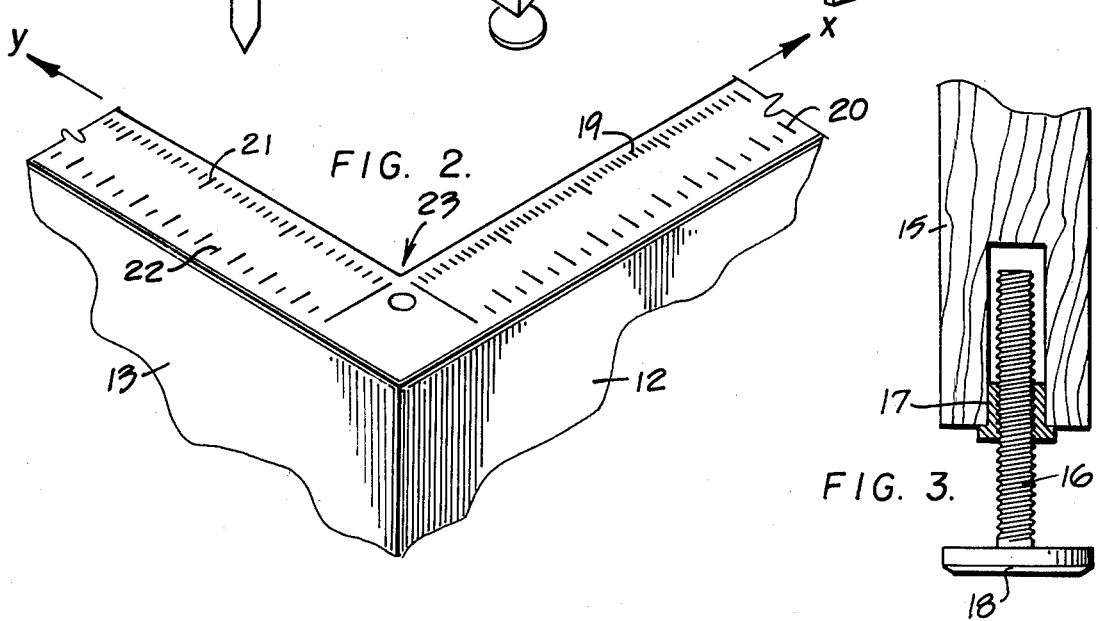

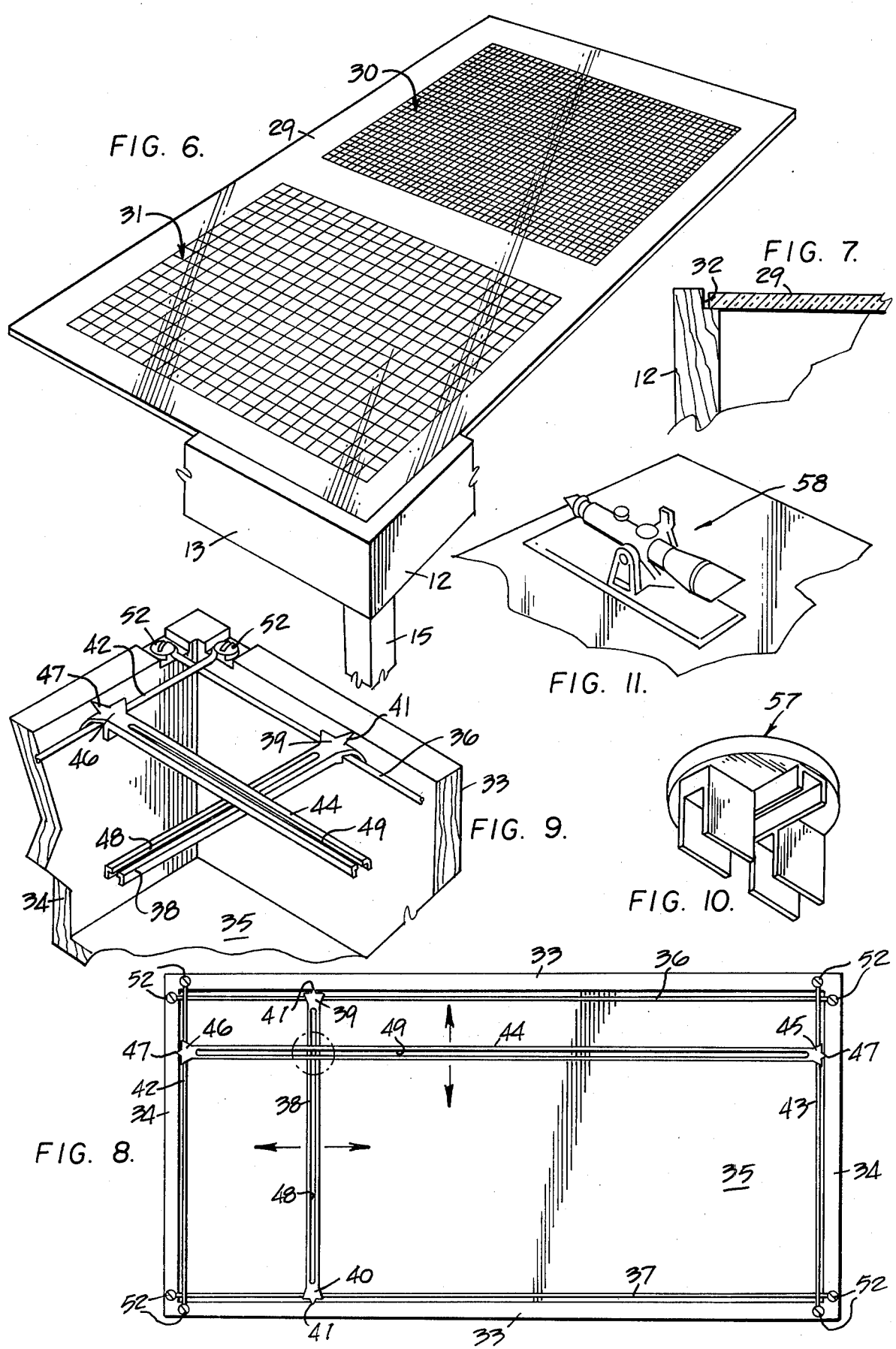

ENGINEERING AND EDUCATIONAL TABLE AND METHOD OF USE

BACKGROUND OF THE INVENTION

The present invention relates to engineering and teaching aides and pertains particularly to an engineering and teaching table and method.

In this teaching of various subjects from kindergarten to college visual aides are extremely helpful in speeding the learning and teaching processes. Such visual aides are also helpful in city and community planning and development.

While many visual aides are known and used in schools and universities for assistance in teaching certain subjects, visual aides which enable the outdoors to be brought indoors in three dimensional form have not heretofore been available. While photographs and field trips are available for such instruction, they are limited in the area that can be covered as well as the time and place of use.

While landscape and other architects and city planning engineers have used models to scale for laying out developments and the like, such models are generally of a rigid and permanent structure and cannot be easily changed or reused. Thus, a new model must be constructed for each creation.

The present invention provides means for overcoming the above problems of the prior art.

SUMMARY AND OBJECTS OF THE INVENTION

In accordance with its primary aspect, the present invention comprises a box-like container mounted on suitable supporting means and containing a suitable quantity of granular medium for shaping into simulated landscapes, various distance and angular measuring implements associated with the table for establishing distances, location, angular relationships and elevations of various points throughout the simulated landscape.

It is a primary object of the present invention to overcome the above problems of the prior art.

Another object of the present invention is to provide a method and apparatus for creating and aiding in the instruction regarding geographic relationships and scaled structures.

A further object of the present invention is to provide a teaching and engineering table and associated equipment for assisting in the teaching of subjects relating to geographical and geometrical structures and relationships and for use in creating simulated scaled landscape and geographical locations.

BRIEF DESCRIPTION OF THE DRAWINGS

The above and other objects and advantages of the present invention will become apparent from the following description when read in conjunction with the drawings wherein:

FIG. 1 is a perspective view of a table in accordance with the present invention;

FIG. 2 is a detailed view of a portion of the table of FIG. 1 showing associated scale means;

FIG. 3 is a view showing details of leveling means of the table of FIG. 1;

FIG. 4 is a perspective view of a transit with mounting base for use with the table of FIG. 1;

FIG. 5 is an elevational view of a stadia for use with the transit of FIG. 4;

FIG. 6 is a perspective view of a top plate for the table of FIG. 1;

FIG. 7 is a detailed view of a portion of the table of FIG. 6;

FIG. 8 is a plan view of a modification of the table of FIG. 1;

FIG. 9 is a detailed fragmented view of a portion of FIG. 8 showing details thereof;

FIG. 10 is a perspective view of a compass base for adapting the instrument of FIG. 4 to use with the modification of FIG. 8; and, FIG. 11 is an aid for use with the plane table top of FIG. 6.

DETAILED DESCRIPTION OF THE PREFERRED EMBODIMENT

Turning now to FIG. 1 of the drawings there is illustrated a basic element in the combination of the present invention consisting essentially of a box-like container indicated generally by the reference numeral 10 which may be more appropriately referred to as an engineering box or an engineering table. The engineering box or table as illustrated consists essentially of a substantially rectangular plane bottom 11 to which is joined a pair of vertically extending side walls 12 and a pair of vertically extending end walls 13 thereby defining a box-like container. The container may have any geometric shape, however, for convenience a rectangular shape is shown. The container is designed for containing a suitable medium 14 of granular or particulate material such as sand, sawdust, soil or the like to be constructed or shaped into miniature landscape designs and features. It is also designed to hold water to represent lakes, streams or an ocean. The box 10 is supported on a plurality of legs 15 which are preferably removable therefrom and are also adjustable for making substantial adjustments in the height of the table. The container can vary in size and shape to suit its purpose. The length and width can vary from a few feet to several feet. The depth can vary from a few inches to several inches.

The legs 15 are preferably removable such that the box 10 may be set on the floor, for example, when used in instructing children if desired. The legs 15 are also preferably adjustable and may be constructed as telescoping in any well-known manner such that the table may be adjusted for use while seated or standing for children and/or for adults. One example of adjusting means is illustrated and includes a screw-like member 16 receivable in a nut-like member 17 in the leg 15 and including a foot 18.

Various distance and angle measuring means are associated with the engineering box or table for measuring distances between various points or structures and angles between various points for distances and angles with respect to base line or points. One such measuring means may be as shown, for example, in FIG. 2 and comprises scale means 19 in the metric system running along the upper edge of one or more of the side members 12 and scale means 20 in the English system running along the same upper edge of the same side means. Second scale means 21 in the form of a metric scale and 22 in the form of English scale run from the same corner of the table 23 which may be established as the zero or datum point. These scales may be defined as running along from the corner 23 from a position defined as the zero position and running along an X and Y axis such as illustrated in FIG. 2. A Z axis would be considered to extend vertically from this point with the zero point of the Z axis selected as either the upper edge of the table or the bottom of the table. Portable scale means such as a steel tape may also be used in conjunction with the table.

Other measuring instruments such as a miniaturized surveyor's transit 24, is usable in conjunction with a stadia 25 shown in FIG. 5 for carrying out conventional surveying operations with the landscape formed with the medium 14 within the container of the table. The transit 24 preferably includes a base 26 which may be movable and clampable to various positions along the edges of the sides and ends 12 and 13 respectively. The transit also includes the usual elevational measuring or indicating means and preferably also includes horizontal and distance measuring or indicating means. An alternate transit modification is shown generally at 27 wherein the base 28 is adapted to fit the corners of the table. With such an arrangement the axis of the transit is mounted directly over the zero point at the corner 23 and thus all measurements of angles and distances are made from this datum point such as the intersection of the X, Y, and Z axis.

With the above construction, a complete course in surveying may be taught in a classroom with the engineering box or table and its associated instruments as above described utilized in demonstrating the various steps and in permitting the students to practice the steps taught. The art of surveying and the various functions carried out thereby are known and described, for example, in the article by D. Haertlein, found in Section 18-50 through 18-61 of *Mark's Standard Handbook for Mechanical Engineers,* 7th Edition, published by McGraw, Hill Book Company and incorporated herein by reference. The procedures described therein can be carried out on a miniature scale with the present invention.

Referring now to FIG. 6 a plane transparent top plate 29 of a generally rectangular configuration fitting the top of the box of FIG. 1 as illustrated may be provided. This top is preferably a hard smooth surface and is transparent so that the details of the landscaping or other constructional features shown below can be observed. This permits surveying and the like to be carried out without disturbing the underlying structures. Overlying grids 30 and 31 of selected scale such as English or metric may also be provided on the top in order to assist in establishing coordinates in locating and identifying points on the underlying simulated landscape. These grids may be removable overlays and may be in either the English or metric system. The top 29 may be mounted in any suitable manner such as that shown in FIG. 7 wherein the top fits within a groove 32 formed in the upper inside edge of the sides and ends 12 of the table. The top 29 also provides a smooth hard surface upon which writing may be done. It also enables the table to be utilized for other purposes such as study or the like independent of the underlying formations formed therein.

Turning now to FIG. 8 an alternate embodiment of the table is shown. In this embodiment the box is constructed as above by side pieces 33 and ends 34 extending upward from a bottom 35 for defining a box-like structure. Guide means such as a plurality of thin bars 36 and 37 running parallel to the side 33 and closely adjacent thereto provide guide means or track for a bar or the like 38 mounted by suitable guide means 39 and 40 at each end thereon. A suitable pointer or indicator 41 may be provided at one or both ends of the bar 38 to cooperate with scales such as 19 and 20 formed on the edge of the side members 33 and 34. Similar guide rods 42 and 43 run closely parallel to the end walls 34 and similarly provide rail means for a second bar 44 mounted thereon by suitable bracket means 45 and 46. Similar pointer or indicator means 47 is also provided at one or both ends of the rail rod 44. The bars intersect at points above the table and can be moved to intersect above a selected point. The pointers 41 and 47 then point to positions on scales 19 and 21 indicating the distances along the X and Y axis to the point.

The illustrated bars 38 and 44 are of sufficient width to provide some structural ability and for that reason slots 48 and 49 are formed in and extend the length of the bars to permit viewing therethrough and enhancing the accuracy of the location of a point on the simulated or other structure landscape below. The ends of the rods 36 and 42 are secured in a suitable manner to the sides 33 and 34 such as by screws or the like 52 for example. These screws and rods are preferably countersunk within the upper edge of the box in order that a top may be fitted thereto.

A suitable vibrator indicated generally at 50, is provided for applying vibrations to the table and contained structure for simulating earthquakes. A spigot 51 is provided for draining any liquid from the table such as when lakes and streams have been demonstrated.

Scale model building structures are also provided. For example, building structures 53 are provided for providing scale models of high-rise buildings, such as hospitals, apartment or office buildings. Other structures 54 are provided for providing low-rise buildings such as schools, hospitals, factories and the like. Single family dwellings are represented by building structures 55. A body of liquid 56 represents a lake or an ocean.

The above-described education and engineering box or table and its associated instruments are contemplated for use in carrying out many methods of instruction and creation of simulated landscapes, developments and similar structures. For example, the above-described table and its associated apparatus is intended to be used both for visual and manipulative teaching and learning and in the professional areas of engineering and architecture.

In the field of instruction, the table may be used for any grade of student from elementary and kindergarten to advanced college level engineering students. In lower grade levels, for example, stories can be dramatized by creating the environment of the story. For example, in Red Riding Hood the forest with various trees and location of houses lived in by Red Riding Hood and her Grandmother are established. The path and events that occur chronologically can then be planned and visualized by the students. Students can also be asked to set up a representation of their own neighborhood or community.

In more advanced grade levels, social studies, for example, can include the study of transportation and the like and the development and growth of cities and towns. For example, in FIG. 1, portions of a city are illustrated with high-rise buildings 53, a low-rise building 54, and residential housing at 55. A body of water is illustrated at 56.

The engineering table can also be used in teaching the physical sciences and mathematics such as land formations, land surveying and physical geometry. Simple linear measurements can be made with progression to more complicated measurements such as angles and elevations. For example, a complete course in surveying can be taught and completely demonstrated with the table and associated instruments. A land formation can be created of various elevations with the medium 14 and the various elevations distances and slopes can be determined with instruments such as a transit 24 or 27 with stadia 25.

The concept of roadmap coordinates and longitude and latitude of the earth or globe can also be demonstrated.

Upper levels of mathematics such as trigonometry when horizontal and vertical angular measurements are complimented by linear measurements is also possible. The use of a specially designed transit is helpful in making horizontal and vertical angular measurements. The specially designed transit is preferably miniaturized. The transit can have various bases such as shown for example in FIG. 1, FIG. 4, FIG. 10 and FIG. 11. The base of FIG. 1 is designed to be mounted anywhere along the upper edge of the table. The transit base of FIG. 4 is designed to be mounted at any corner of the table. The base 57 illustrated in FIG. 10 is designed to mount at the intersection of bars 38 and 44. This corresponds to placing the transit over a point on the terrain and measuring angles, distances, elevations, etc. from that point.

An aladade as illustrated in FIG. 11 can be used with the plane table top. Thus, the many modifications of the instruments for use with the table adds to its versatility.

The present invention can be used in conjunction with engineering and architectural studies and/or the creation of environmental conditions.

City planners and engineers can quickly shape the medium 14 into either an existing or proposed landscape or formation and quickly change it. Existing and/or proposed structures can be quickly added, moved and/or removed from the landscape.

The medium 14 is selected such that it may be used and reused without the necessity of replacement and thus when the study of a particular development or the like has been concluded the medium can be reshaped into another development or landscape structure.

The medium can be any suitable material that is preferably clean, light in weight and has sufficient body to retain its shape without solidifying. A moistened sand could be satisfactory where weight is not a problem. A lightly oiled fine sawdust would be suitable where weight is a problem. The material should be clean, non-toxic and easily cleaned from floors and clothes. A light non-toxic oil could be used as a moistening agent.

Thus the novel combination of table and instruments provide a novel and unique system for the creation and teaching of the creation of various models for communities and other settings.

While the present invention has been described by means of a particular embodiment, it is to be understood that numerous changes and modifications may be made therein without departing from the spirit and scope of the invention as defined in the appended claims.

What is claimed is:

1. A landscape instruction and design table comprising in combination;
   a generally rectangular box-like container having a bottom and vertically extending sides terminating at an upper edge for supporting a removable top;
   a removable top plate providing a plane working surface adapted to rest on said upper edge;
   a quantity of non-fluid material disposed in said container for shaping into simulated landscapes;
   distance measuring means associated with said container for measuring distances of selected points within said container from each other and from a base reference point; and,
   angle measuring means comprising a transit associated with said container and sealed for functioning therewith for measuring vertical and horizontal angles betwen points within said container and between said points and a reference axis.

2. The invention of claim 1 wherein said granular material comprises a moistened sawdust.

3. The table of claim 1 wherein said top plate is transparent and includes grid means associated therewith for defining location of points within said container.

4. The invention of claim 1 including:
   guide means mounted adjacent the edges of said container; and,
   indicator means slidably mounted on said guide means for positioning above points in said table.

5. The invention of claim 1 wherein said granular material comprises a moistened sand.

6. The invention of claim 1 wherein said angle measuring means further comprises a compass.

7. The invention of claim 1 including stadia means for use with said transit for measuring elevations within said container.

8. The invention of claim 1 wherein:
   said distance measuring means comprises scale means formed along the upper edge of the sidewalls of said container.

9. The invention of claim 5 including:
   guide means mounted adjacent the edges of said container; and,
   first and second indicator means intersecting above said table and slidably mounted on said guide means for positioning above selected points in said table and cooperating with said scale means for defining the distance of said reference point from a selected reference point.

10. The invention of claim 9 including stadia means for use with said transit for measuring elevations within said container.

11. The table of claim 1 wherein said top plate is transparent and includes grid means associated therewith for defining location of points within said container;
   guide means including a plurality of rods mounted and extending along adjacent the edges of said container;
   indicator means including a pair of bars slidably mounted on said guide means and extending at right angles to one another for positioning the point of intersection thereof above points in said table;
   said distance measuring means comprises scale means formed along the upper edge of the sidewalls of said container for cooperation with said indicator means, wherein said angle measuring means is a transit, and further including stadia means for use with said transit for measuring elevations within said container.

12. The table of claim 11 wherein said transit includes a base formed to mount to said pair of bars at the intersection thereof.

13. The table of claim 11 wherein said transit includes a base formed to mount and clamp to the upper edge of said table.

14. The table of claim 13 wherein said base is formed to mount at the corners of said table.

15. A method of creating and teaching spatial and angular relationships between simulated landscape formation and structures, the steps of:

establishing a predetermined scale to which a miniature landscape is to be constructed;

providing a granular non-fluid medium for shaping into a temporary simulated landscape formations;

providing a generally rectangular box-like container for containing said granular non-fluid medium;

providing distance measuring means for measuring distances between points within said container and with respect to a base reference point by establishing one corner of said container as a base reference point, and forming measuring scales extending from said reference point along the edges of said container;

providing vertical and horizontal angular measuring means for measuring vertical and horizontal angles between points within said container and a base axis by providing a miniature transit scaled to function within the dimensions of said container, and providing a base for mounting said transit on the edge of said container;

shaping said medium into a simulated landscape in proportion to said scale;

establishing the location and distal relationship between structures of said formation by said distance measuring means; and, establishing the angular relationship of structures of said formation by said angular measuring means.

16. The method of claim 15 including providing first means extending between opposite sides of said container and second means extending between opposite ends of said container, said first means and said second means intersecting above said container for establishing the location of a point within said container.

* * * * *